US009426754B2

(12) United States Patent
Steer

(10) Patent No.: US 9,426,754 B2
(45) Date of Patent: Aug. 23, 2016

(54) DEVICE DYNAMIC TOTAL RF POWER COMPENSATION

(71) Applicant: Research in Motion Limited, Waterloo (CA)

(72) Inventor: David G. Steer, Nepean (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 154 days.

(21) Appl. No.: 13/916,973

(22) Filed: Jun. 13, 2013

(65) Prior Publication Data

US 2014/0370830 A1  Dec. 18, 2014

(51) Int. Cl.
 *H04W 52/28* (2009.01)
 *H04W 52/18* (2009.01)
 *H04W 52/14* (2009.01)
 *H04W 52/36* (2009.01)

(52) U.S. Cl.
 CPC ........... *H04W 52/18* (2013.01); *H04W 52/288* (2013.01); *H04W 52/146* (2013.01); *H04W 52/367* (2013.01)

(58) Field of Classification Search
 CPC ... H04W 52/00; H04W 52/18; H04W 52/28; H04W 52/283; H04W 52/288
 USPC .................................. 455/115.1, 127.1, 522
 See application file for complete search history.

(56) References Cited

U.S. PATENT DOCUMENTS

| | | | |
|---|---|---|---|
| 6,710,651 B2 * | 3/2004 | Forrester | 330/129 |
| 8,326,385 B2 | 12/2012 | Brogle et al. | |
| 8,406,814 B2 | 3/2013 | Bychkov et al. | |
| 8,954,121 B2 * | 2/2015 | Kanj | H01Q 1/242 455/575.7 |
| 2012/0190398 A1 * | 7/2012 | Leukkunen | 455/522 |
| 2012/0214422 A1 | 8/2012 | Shi et al. | |
| 2012/0270519 A1 | 10/2012 | Ngai et al. | |
| 2014/0128032 A1 * | 5/2014 | Muthukumar | 455/411 |
| 2014/0349701 A1 * | 11/2014 | Vajapeyam et al. | 455/522 |

FOREIGN PATENT DOCUMENTS

| | | |
|---|---|---|
| EP | 1298809 A2 | 4/2003 |
| WO | 2012122116 A1 | 9/2012 |

OTHER PUBLICATIONS

Corresponding European Patent Application No. 14171042.6, Search Report dated Jul. 14, 2014.
5.4.6. Power Headroom Reporting, LTE; Evolved Universal Terrestrial Radio Access (E-UTRA); Medium Access Control (MAC) protocol specification (3GPP TS 36.321 version 10.2.0 Release 10).

* cited by examiner

*Primary Examiner* — Blane J Jackson
(74) *Attorney, Agent, or Firm* — Perry + Currier, Inc.

(57) ABSTRACT

A system and method may dynamically control the total RF power emissions of a mobile device. The method may include determining the local RF operating situation of the mobile device; setting a maximum power limit according to the local RF operating situation; and/or adjusting an active transmitted power of the mobile device within the maximum power limit. The local RF operating situation may be determined based upon (1) the measuring of a matching of the mobile device's radio antenna(s); (2) currently active application(s); (3) the number/type of active radios; (4) frequency or wavelength of transmissions; (5) network, relay, or node RF operating or exposure conditions; and/or (6) a power control process. The mobile device may be a hand-held device, HomeNodeB, or other device capable of RF communications. The local RF operation situation and/or available headroom may be communicated to a network base station or node to facilitate enhanced mobile device performance.

14 Claims, 5 Drawing Sheets

DEVICE DYNAMIC TOTAL RF POWER COMPENSATION

FIELD

The present embodiments relate generally to mobile device total allowable Radio Frequency (RF) power. More particularly, the present embodiments relate to dynamically adjusting mobile device total allowable RF power.

BACKGROUND

With conventional mobile devices, the maximum total RF power emissions may be fixed at manufacture by the device class. In commercial mobile networks for example, the total allowed RF power may often be set at about 23 dBm (200 mW). This limit may be determined by a number of factors, including the capability of RF components and batteries, but the maximum may ultimately be set by the acceptable limits for exposure in the worst case operating situations.

Having a fixed or static maximum total RF power limit for mobile devices may lead to inefficient and limited operation. For instance, communication range, data throughput, multi-radio operation, bandwidth usage, and/or other performance capabilities of a mobile device may suffer. The present embodiments, inter alia, may overcome these and other deficiencies.

BRIEF SUMMARY

The present embodiments disclose an apparatus and method that may dynamically adjust a mobile device's total allowable RF power based upon the measured operating or exposure situation and the appropriate exposure and/or network limits. The mobile device may measure its operating situation and/or the number of active radios and their bandwidth together with the active device applications, and then may determine the current allowed exposure limit and consequent allowed RF total power. The mobile device may dynamically signal the power "headroom" available for network power control processes to the network or other devices. Under appropriate operating conditions, the method may enable constant Power Spectral Density (PSD) with increasing bandwidth and channel aggregation, and thus provide improved throughput and range for the mobile device. The present embodiments may enable more efficient use of the increased system RF bandwidths available through channel aggregation than is otherwise possible with a conventional or fixed total RF power limit. The present embodiments may be implemented in the mobile device without changes or extensions to existing communications standards.

In one aspect, a method of dynamically controlling the total RF power emissions of a mobile device may be provided. The method may include determining the local RF operating situation of the mobile device; setting a maximum power limit according to the local RF operating situation; and/or adjusting an active transmitted power within the maximum power limit, such as a maximum power limit according to an applicable exposure limit, power control process, network limit, and/or other factors. The local RF operating situation may be determined based upon (1) a measuring of a matching or a loading of the mobile device's active radio antenna(s); (2) currently active applications operating on the mobile device, such as applications related to speech, voice, keyboard, touch, text, viewing, holster, browsing, email, idle, hands free, and/or other operations/ applications; (3) the number and/or type of active radios on the mobile device; (4) the frequency or wavelength of the mobile device's transmission(s) and/or received transmission(s); (5) a power control process associated with a network, relay, node, access point (AP), HomeNodeB, WiFi AP, and/or the mobile device; and/or (6) network, relay, local node, access point, HomeNodeB, WiFi AP, and/or mobile device exposure, dosage, or other RF or RF power-related conditions. The mobile device may be a hand-held device (such as a cell phone, smart-phone, laptop or notebook computer, tablet, etc.), a HomeNodeB (HNB), access point, WiFi AP, or other relay, node, or device capable of RF wireless transmissions.

In another aspect, a method of dynamically controlling the total RF power emissions of a mobile device may be provided. The method may include determining the local RF operating situation of the mobile device; and/or adjusting an active transmit power or active transmit power level of the mobile device based upon the local RF operating situation. The local RF operating situation of the mobile device may be determined based upon one or more factors, such as (a) measuring a matching of one or more active radio antennas on the mobile device; (b) which applications on the mobile device are currently active; (c) a number and/or type of mobile device active radio antennas; (d) the frequency or wavelength of the mobile device's transmission(s) and/or received transmission(s); (e) a power control process associated with a network, relay, node, access point, HomeNodeB, WiFi AP, and/or the mobile device; and/or (f) network, relay, node, access point, HomeNodeB, WiFi AP, and/or mobile device exposure, dosage, or other RF or RF power-related conditions. The mobile device may be a hand-held device, a HomeNodeB, a WiFi AP, or other access point, relay, node, or device with RF communication functionality, including those disclosed elsewhere herein.

In another aspect, a method of dynamically controlling the total RF power emissions of a mobile device may be provided. The method may include determining the local RF operating situation of the mobile device; and/or increasing or decreasing an active transmit power and/or active transmit power limit of the mobile device based upon the local RF operating situation. The active transmit power or power limit of the mobile device may be adjusted such that the performance of the mobile device may be optimum for a given exposure and/or dosage limit, i.e., the mobile device remains compliant with exposure and/or dosage limits, such as Specific Absorption Rate (SAR) and/or field strength limits, while mobile device performance may be enhanced. The local RF operating situation of the mobile device may be determined by: (a) measuring a matching or loading of the mobile device's active radio antenna(s), such as via a Voltage Standing Wave Ratio (VSWR) measurement; (b) which applications on the mobile device are currently active, such as applications related to speech, voice, text, keyboard, touch, hands free, idle, holster, browsing, viewing, email, or other operations/applications that indicate a proximity and/ or relationship between the mobile device and the user; (c) the number and/or type of radios in use by the mobile device, such as WiFi, LTE, Bluetooth™, and other radios; (d) the frequency or wavelength of the mobile device's transmission(s) and/or received transmission(s); (e) a power control process associated with a network, relay, node, access point, HomeNodeB, WiFi AP and/or the mobile device; and/or (f) network, relay, node, access point, HomeNode B, WiFi AP, and/or mobile device exposure, dosage, or other RF or RF power-related conditions. The mobile device may be a hand-held device, a HomeNodeB, a WiFi AP, or other access point, relay, node, or device capable of RF wireless transmissions, including those disclosed elsewhere herein.

In another aspect, in some situations, for example for operations with public safety networks, a mobile device may be allowed into a high power mode to better enable its detection and communication in situations in which it may otherwise be out-of-communication.

In another aspect, the mobile device may monitor total exposure dose (i.e., the integral of power exposure over time) and at times allow using additional RF power while remaining within the allowed exposure dosage.

In another aspect, the mobile device dynamic total RF power measurement control process may be utilized to protect such things as medical body implants of a user by reducing power and/or blocking channels based upon the current exposure situation and/or the location and type of medical implant.

Advantages will become more apparent to those skilled in the art from the following description of the preferred embodiments which have been shown and described by way of illustration. As will be realized, the present embodiments are capable of other and different embodiments, and their details are capable of modification in various respects. Accordingly, the drawings and description are to be regarded as illustrative in nature and not as restrictive.

BRIEF DESCRIPTION OF THE DRAWINGS

There are shown in the drawings arrangements which are presently discussed, it being understood, however, that the invention is not limited to the precise arrangements and instrumentalities shown, wherein.

DETAILED DESCRIPTION

Figure 1:
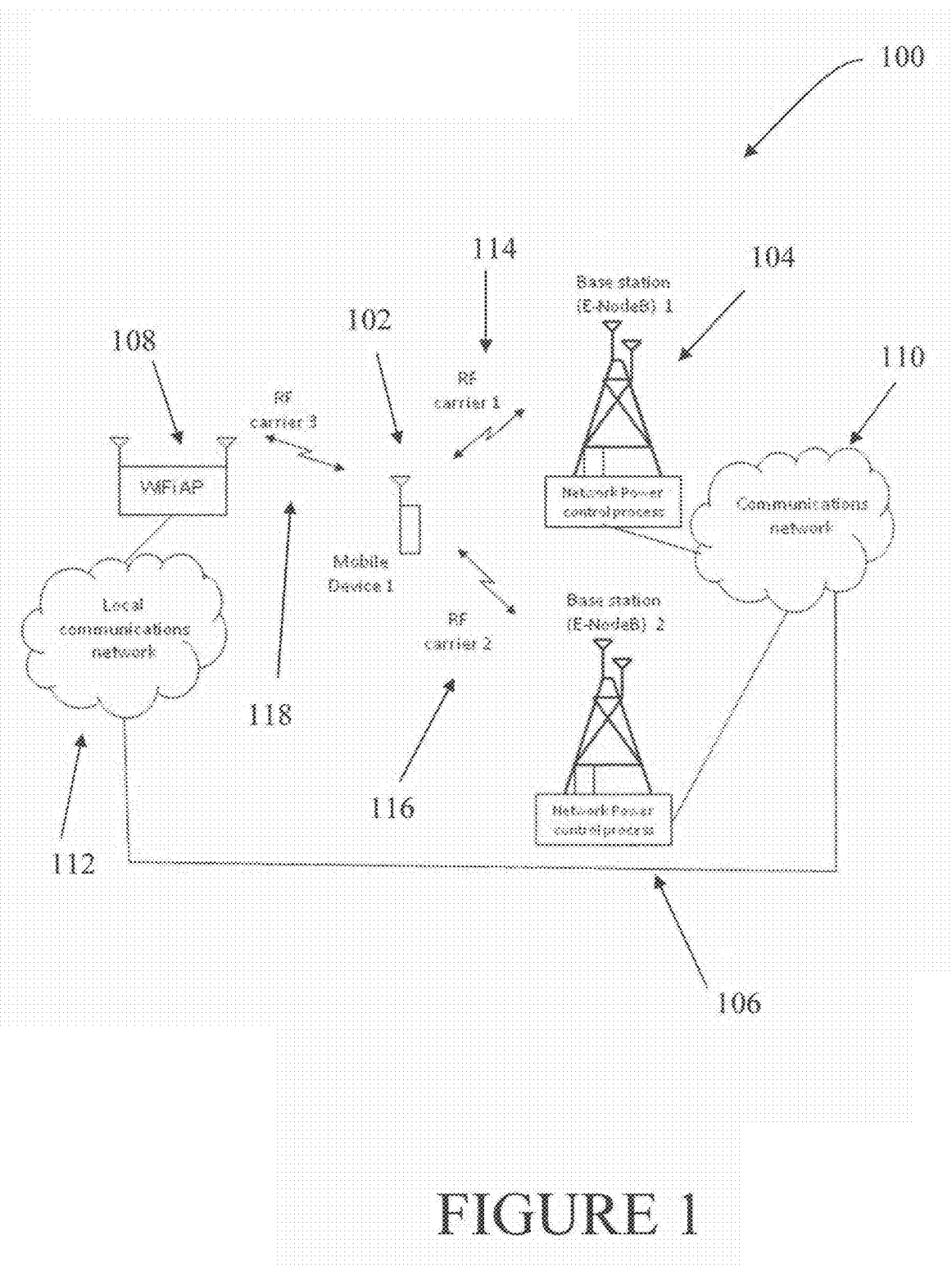
FIG. 1 illustrates an exemplary mobile device with multiple radio links.

The present embodiments relate to dynamically adjusting a mobile device's total allowable RF power based upon the measured operating situation of the mobile device and appropriate exposure and/or network limits. A mobile device may measure its operating situation, and/or the number of active radios and their bandwidth together with the active device applications, and then determine the current allowed exposure limit and consequent allowed RF total power. The mobile device may dynamically signal the power headroom available for network power control processes. Under appropriate operating conditions, the present embodiments may enable constant PSD with increasing bandwidth and channel aggregation, and thus may provide improved mobile device throughput and range. The present embodiments may also enable more efficient use of the increased system RF bandwidths available through channel aggregation than is otherwise possible with a fixed total power limit.

In one embodiment, a method may provide for dynamically setting a transmit power limit of a mobile device based upon a current operating situation of the mobile device. The current operating situation may be determined by measuring the matching of the mobile device's radio antenna(s) in use. Measuring of the matching or loading of the radio antenna(s) may be performed by measuring VSWR across a sensing element located in the transmit path of the antenna(s). Alternatively or additionally, the current operation situation may be determined by the applications currently active on the mobile device. The active applications that may indicate the current operating situation of the mobile device may include speech-related, text-related, hands free-related, browsing or viewing-related, and/or other applications, including those discussed elsewhere herein.

The applications in current use may suggest or indicate proximity of the mobile device to the user, and/or a spatial relationship of the mobile device with respect to the user. Measuring the matching of the radio antenna or antennas may also provide an indication of proximity of the mobile device to the user, and/or a spatial relationship of the mobile device with respect to the user.

I. Conventional Devices

With current mobile devices, the maximum total RF power emissions may be static and/or fixed at manufacture by the device class, such as about 23 dBm (200 mW). The total RF power is the sum from all radios operating in all bands. Thus, a device utilizing both a WiFi radio and a LTE radio may be limited to no more than 23 dBm as the sum of the power from both radios. In cases of channel aggregation, for example in LTE, the total power in several channels, either contiguous or in multiple bands, may also be limited to no more than 23 dBm. This may have the disadvantage that as additional channel bandwidth is made available by the network to increase throughput from the mobile device, the PSD of the RF emissions must be reduced to stay within the total power limit. The decreased PSD may reduce either the communication range or the data throughput of the mobile device, thus diminishing the advantage of additional bandwidth. The fixed maximum power restriction may apply even if the mobile device is in an operating situation in which the exposure limit would not be exceeded with an increased RF power emission.

A mobile device operating simultaneously with LTE, WiFi, and/or Bluetooth™ may also suffer reduced performance with the radio links as a result of the limit on the total RF power for the multiple radios, and the consequent reduced power operation for individual channels. Activating the WiFi radio, for example, may decrease the performance of the LTE radio links as a result of their power being scaled back to accommodate the WiFi power.

A. Exemplary Mobile Device Operation

FIG. 1 illustrates a mobile device 102 operating in a multi-radio environment 100. In this case, the mobile device 102 is providing two RF uplink signals, RF carrier 1 114 and RF carrier 2 116, to Base Station 1 104 and Base Station 2 106, respectively, as well as one RF signal, RF carrier 3 118, to the WiFi Access Point (AP) 108.

The mobile device 102 may be communicating with a communications network 110 via Base Station 1 104 and Base Station 2 106. For example, a first radio on the mobile device 102 may be in wireless communication with Base Station 1 104 over RF carrier 1 114, and a second radio on the mobile device 102 may be in wireless communication with Base Station 2 106 over RF carrier 2 116. Base Station 1 104 and Base Station 2 106 may each be controlling network resources, RF communications with multiple devices, and/or other network operations in accordance with a network power control process.

Simultaneously, the mobile device 102 may be in communication with a local communications network 112 via the WiFi AP 108. For example, a third radio on the mobile device 102 may be in wireless communication with the WiFi AP 108 over RF carrier 3 118. WiFi AP 108 may be controlling local resources, RF communications with multiple devices, and/or other operations in accordance with a node or AP power control process.

With three radios operating in the mobile device 102, the maximum power on each link must be reduced by a factor of about ⅓ (or about −4.8 dB) each, assuming equal maximum power on all three links, to comply with worst case exposure limits. This reduced RF power may reduce the range and throughput performance of the RF links, and thus lead to a reduced user quality-of-experience with their mobile device 102 and an increased risk of a dropped call.

B. Exemplary HomeNodeB Operation

Figure 2:
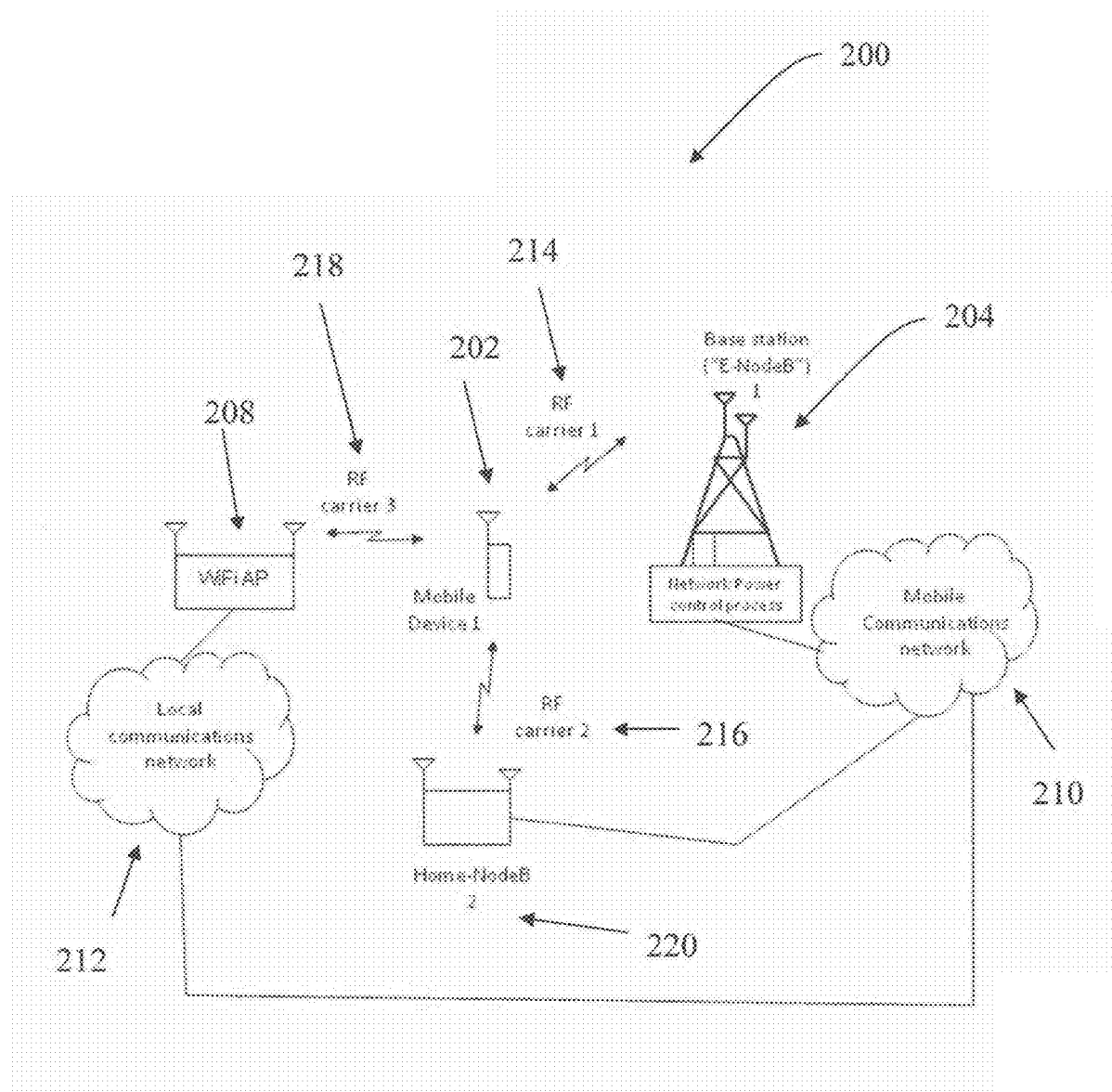
FIG. 2 illustrates an exemplary HomeNodeB deployed in general population and in an uncontrolled exposure situation.

In some other situations, the exposure situation of network equipment for small cells, such as a HomeNodeB (HNB) or other local node or relay, may require dynamic RF total power compensation. FIG. 2 illustrates an exemplary HomeNodeB deployed in general population and in an uncontrolled exposure situation 200.

As shown in FIG. 2, the mobile device 202 may provide two RF uplink signals, RF carrier 1 214 and RF carrier 2 216, to Base Station 1 204 and HomeNodeB 220, respectively, as well as one RF signal, RF carrier 3 218, to the WiFi AP 208.

The mobile device 202 may be communicating with a communications network 210 via Base Station 1 204 (over RF carrier 1 214) and HomeNodeB 220 (over RF carrier 2 216). Simultaneously, the mobile device 202 may also be in communication with a local communications network 212 via the WiFi AP 208 (over RF carrier 3 218).

In general, a HomeNodeB may typically be deployed in general population situations, such as in the home or office, and be subject to lower RF power limits than the main network base stations (NodeB). A HomeNodeB may be deployed in locations in which it is regularly in close proximity to people. In such situations, the power of the HomeNodeB may be constrained, and thus it may be unable to transmit additional power if it is using wider bandwidth channels and/or communicating with multiple mobile devices of user equipment (UE). The HomeNodeB may be constrained in its use of channel aggregation for its downlinks due to the need to protect worst case exposure situations, even though the equipment may be deployed in a location well separated from the population. A HomeNodeB also including a WiFi access point may be further constrained in its operation by the total power emission for multiple radio systems, such as both WiFi and LTE simultaneously.

It may be advantageous to have an apparatus and method of operating a mobile device, such as a hand-held device and/or a HomeNodeB, that enables the mobile device (e.g., the hand-held device, HomeNodeB, and/or other devices) to adjust its total power emissions when operating with multiple radios in different exposure situations and yet still comply with the appropriate exposure limits.

II. Exemplary Exposure Limits

The following paragraphs provide some background material for the United States outlining the exposure limits and illustrates different limits may apply for differing operating situations, and for different relationships to the user. Under these regulations, field strength limits may apply for separation distances of greater than 20 cm while different SAR limits may be applicable for (a) whole body, (b) partial body, and (c) hands, wrists, feet and ankles scenarios.

In the case of cellular and Personal Communications Service (PCS) cell site transmitters, the Federal Communications Commission's (FCC's) RF exposure guidelines recommend a maximum permissible exposure level to the general public of approximately 580 microwatts per square centimeter ($\mu W/cm2$) at an operating frequency of about 870 MHz.

The FCC rules for evaluating "mobile devices" (as defined by the FCC, and not by this Application) for RF compliance are found in 47 Code of Federal Regulations (CFR) §2.1091. For purposes of RF exposure evaluation, a mobile device as defined by the FCC (and not by this Application) is a transmitting device designed to be used in other than fixed locations and to be generally used in such a way that a separation distance of at least 20 centimeters is normally maintained between the transmitter's radiating structures and the body of the user or nearby persons.

The FCC rules for evaluating "portable devices" for RF exposure compliance are contained in 47 CFR §2.1093. For purposes of RF exposure evaluation, a portable device as defined by the FCC is a transmitting device designed to be used with any part of its radiating structure in direct contact with the user's body or within 20 centimeters of the body of a user or bystanders under normal operating conditions. (See 47 CFR §§1.1307(b)(1), 2.1091 and 2.1093 for details. SECTION 1: FCC RULES FOR RF COMPLIANCE OF MOBILE AND PORTABLE DEVICES) This category of devices may include hand-held cellular and PCS telephones that incorporate the radiating antenna into the hand-piece and wireless transmitters that are carried next to the body. Portable devices may be evaluated with respect to SAR limits for RF exposure.

Both the ANSI (American National Standards Institute)/IEEE (Institute of Electrical and Electronics Engineers) and NCRP (National Council on Radiation Protection & Measurements) exposure criteria are based upon a determination that potentially harmful biological effects may occur at a SAR level of 4.0 W/kg as averaged over the whole body. Appropriate safety factors were then added to arrive at limits for both whole body exposure (0.4 W/kg for "controlled" or "occupational" exposure and 0.08 W/kg for "uncontrolled" or "general population" exposure, respectively) and for partial body exposure (localized SAR), such as might occur in the head of the user of a hand-held cellular telephone. The applicable partial body SAR limit for portable transmitters used by consumers may be 1.6 watts/kg, which is averaged over any one gram of tissue defined as a tissue volume in the shape of a cube.

Note that in this background material, excerpts from the FCC and OET (Office of Engineering and Technology) documents are quoted. In those documents, a distinction is made between a mobile device and a portable device. On the other hand, in this Application, the term "mobile device," may include, inter alia, both user equipment which may correspond to an FCC's mobile device when it is more than 20 cm from the user, and to an FCC's portable device when it is closer to the user than 20 cm. More specifically, in this Application, the term "mobile device" as defined by this Application, in addition to encompassing both the mobile and portable devices of the FCC, may also include, inter alia, hand-held devices (such as smart-phones, cell phones, PDA's (Personal Digital Assistants), laptop or notebook computers, tablets, and hand-held mobile or portable computing devices), computers, HomeNodeBs, access points, WiFI APs, nodes, relays, and/or other devices capable of wireless RF communications.

Table I below lists exemplary FCC limits for maximum permissible exposure. The * in the Power Density column of Table I indicates plane-wave equivalent power density. It should be noted that the averaging time for General Population/Uncontrolled Exposure to fixed transmitters may not be applicable for mobile and portable transmitters. (See 47 CFR §§2.1091 and 2.1093 on source-based time-averaging.)

TABLE I

FCC LIMITS FOR MAXIMUM PERMISSIBLE EXPOSURE (MPE)

A) Exemplary Limits for Occupational/Controlled Exposure

| Frequency Range (MHz) | Electric Field Strength (E) (V/m) | Magnetic Field Strength (H) (A/m) | Power Density (S) (mW/cm2) | Averaging Time (minutes) |
|---|---|---|---|---|
| 0.3-3.0 | 614 | 1.63 | (100)* | 6 |
| 3.0-30 | 1842/f | 4.89/f | (900/f)* | 6 |
| 30-300 | 61.4 | 0.163 | 1.0 | 6 |
| 300-1500 | — | — | f/300 | 6 |
| 1500-100,000 | — | — | 5 | 6 |

B) Exemplary Limits for General Population/Uncontrolled Exposure

| Frequency Range (MHz) | Electric Field Strength (E) (V/m) | Magnetic Field Strength (H) (A/m) | Power density (S) (mW/cm2) | Averaging Time (minutes) |
|---|---|---|---|---|
| 03-1.34 | 614 | 1.63 | (100)* | 30 |
| 1.34-30 | 824/f | 2.19/f | (180/f)* | 30 |
| 30-300 | 27.5 | 0.073 | 0.2 | 30 |
| 300-1500 | — | — | f/1500 | 30 |
| 1500-100,000 | — | — | 1 | 30 |

Table II below lists exemplary FCC limits for SAR. It should be noted that while whole body SAR is averaged over the entire body, partial body SAR is averaged over any 1 gram of tissue defined as a tissue volume in the shape of a cube. SAR for hands, wrists, feet, and ankles is averaged over any 10 grams of tissue defined as a tissue volume in the shape of a cube.

TABLE II

FCC LIMITS FOR SPECIFIC ABSORPTION RATE (SAR)

A) Exemplary Limits for Occupational/Controlled Exposure (W/kg)

| Whole body | Partial Body | Hands, Wrists, Feet and Ankles |
|---|---|---|
| 0.4 | 8.0 | 20.0 |

B) Exemplary Limits for General Population/Uncontrolled Exposure (W/kg)

| Whole body | Partial Body | Hands, Wrists, Feet and Ankles |
|---|---|---|
| 0.08 | 1.6 | 4.0 |

III. Exemplary Techniques

The present embodiments provide a method and apparatus that may measure the operating or exposure situation of a mobile device, and then dynamically adjust the allowed total power of the mobile device's RF systems such that the appropriate maximum power may be utilized for the current exposure situation. The measurements may include the electrical matching of the mobile device's antennas to the RF circuitry, the multiple wavelengths (or RF frequencies) of the transmitted RF signals and/or consideration of the mobile device's operating mode, such as usage of the keyboard or speaker-phone to determine proximity to different exposure situations. The adjusted power limit may be signaled to the network power control process through the "headroom" parameter of the network power control algorithm (e.g., for LTE). The network power control process may thus dynamically take advantage of increased power capability of the mobile device without increased interference to other users and maintaining the safety exposure limits.

In one embodiment, a method may be provided for a mobile device to measure the actual operating RF power, the duration of exposure in each scenario, and integrate over time to measure the total dosage a user is exposed to. The mobile device may reduce power emissions or change operating modes and/or active applications if a maximum exposure limit is approached or exceeded.

In another embodiment, a method may be provided that protects medical body implants and similar equipment by reducing their RF exposure based upon situation and specific bands for protection. For example, based upon its measured operating situation, a mobile device may take action to protect the medically implanted devices from exposure or excessive exposure, such as by reducing RF or transmitting power to an appropriate level.

If the mobile device is in an operating situation where there is low exposure, the mobile device may operate its radio, or multiple radios simultaneously, at increased power or powers (compared to the fixed worst case limit of exposure). Thus, improved range and throughput may be provided. Use of the increased RF PSD may enable the mobile device to communicate at higher modulation rates and in shorter bursts, and thus minimize the use of radio network and spectrum resources, and reduce interference for adjacent users. For example, by doubling the transmission rate by means of increased PSD of the transmission, the mobile device may use half the network spectrum resources it would otherwise use. These resources may be reallocated by the network to serve other users, such as via a network control process. This may enable a significant improvement in network system efficiency. By dynamically measuring the exposure conditions and adjusting the total power limit of the RF systems, the mobile device may provide improved performance while also ensuring that the appropriate exposure limits and/or total dosage limits are not exceeded.

The present embodiments may also be applied to classes of mobile devices that operate in multiple regimes of limits on exposure. Some mobile devices may be used under general operating conditions (e.g., "general population/uncontrolled exposure commercial networks"), and also may be operated, for example, with public safety networks (e.g., occupational/controlled exposure) where higher RF power may be utilized under some conditions. A multi-radio, multi-functional device (i.e., one that may be capable of operation with both public safety and commercial networks) that is operating with a Public Safety (PS) system or a network for Public Protection and Disaster Relief (PPDR) may operate its radios within the occupational exposure limits while it is in the public safety mode. When operated with the commercial networks, the mobile device may restrict its operation to the general population exposure limits.

The present embodiments may be implemented without changes or extensions to existing communications standards.

IV. Exemplary Operating or Exposure Situations

Noted above, the allowed RF transmitter total power for a general use mobile device may be limited, typically to about +23 dBm (200 mW) due to the worst case exposure situation possibility of being operated nearby to the user's head. In some cases, users with medical implants may have a different exposure limit and relationship to the user's body to protect the operation of the medical equipment.

The total RF power limit encompasses the power from all possible radios that may be active simultaneously. As mobile devices may now include multiple radios (i.e., GSM/LTE-A (Global System for Mobile communications/Long Term Evolution-A), WiFi, and/or Bluetooth™) and operate in multi-channel modes, such as LTE channel aggregation or WiFi broadband, there is the possibility of multiple radios operating simultaneously. The sum of the power from all of the radios must be kept below the exposure limit. Thus, in a multi-radio/band scenario, the operation of one radio may limit the power available for other radios in the mobile device in order to stay within the total power limits. The mobile device may need to reduce usage of the WiFi radio, for example, if the LTE radio becomes operational for an incoming call.

The limitation of the total power may be a problem with carrier aggregation scenarios, such as in LTE-A where additional RF channels ("bandwidth") may be utilised to increase the uplink throughput from the mobile device. Due to the total power limit, the mobile device may not be able to increase transmit power as it adds additional uplink bandwidth or RF channels. Thus, increasing mobile device operating bandwidth may not actually improve throughput as the radiated power per bandwidth ("power spectral density") is reduced to stay within the allowed exposure limit, and hence reducing the energy per bit of the transmitted signal (and thereby reducing the range or throughput).

In many mobile radio networks, the mobile device's transmit power and bandwidth may be controlled by a network power control process in the base station (NodeB, E-NodeB, HomeNodeB, or other node) or associated network (e.g., LTE and CDMA (Code Division Multiple Access) systems including UMTS (Universal Mobile Telecommunications System)). This may improve the base station receiver performance and minimize the interference to other equipment sharing the same or adjacent RF frequencies. Equalizing the power received from multiple mobile devices at the base station receiver may improve the reception of the multiple signals across the shared bandwidth.

In these situations, the mobile device may be typically operating below its maximum capability and below the exposure limit. There is thus some "headroom" for the mobile device to increase power to account for fading signal conditions or changes in range or interference from the base station. In some network power control processes, for example in LTE, the mobile device signals to the network (via the base station) its available headroom, so that the network power control process can assign an appropriate bandwidth/modulation/coding to the mobile device for maximum efficiency in its uplink transmissions.

An exemplary power headroom reporting technique is disclosed by Section "5.4.6 Power Headroom Reporting" of document ETSI TS 136 321 V10.2.0 Medium Access Control (MAC) protocol specification, which is incorporated herein in its entirety. Other power headroom reporting techniques may be used.

However, as the simple "mobile telephone" devices have become "smart-phones," they may not always be operated in a situation near the user's head that causes the maximum restriction on the RF power as a worst case exposure limit. For example, when used for "texting," mobile devices are typically held in the hand/fingers and thus there may be a lesser user exposure to the RF signals. As a further example, for speech communication, a voice call may make use of a "hands free" speaker and microphone with the mobile device in a situation operating away from the head (e.g., in the user's hand or on a nearby table). This situation may also provide a lesser user exposure to the RF signals.

In other situations, the mobile device may be used for "applications" ("APPs") involving the keyboard and screen while held in the user's hands, resulting in a lesser user exposure to the RF signals. In these situations, a higher exposure limit may be appropriate as the mobile device may be operated away from the head or other more sensitive body parts.

In some situations of standby use, the mobile device may be in a holster or carrying case attached to the user's belt, pocket, purse or backpack, i.e., also in a situation in which there may be lesser user exposure to the RF signals. In many cases (often in a "standby" or "idle" condition), the mobile device may be in a situation not near the user at all, such as in another room, or on a nearby table or seat. In these situations, the mobile device may be at a distance from the user (i.e., greater than 20 cm) and not constrained by SAR exposure limits when it is transmitting (but may be constrained by field strength limits). Increasing deployment of tablets and mobile computing devices may increase the frequency of situations in which the "smart-phones" are not in high exposure situations, and thus may use higher RF transmit powers to take advantage of the higher bandwidths available for wideband communications systems. In these example situations in which the device is operating while in the user's hands, the "Hands, Wrists, Feet and Ankles" exposure limit of the FCC Table II may apply.

In an exemplary embodiment, the operating or exposure situation for a mobile device may be categorized into five situations, each of which may have a different exposure limit: (1) Head situation with the mobile device near sensitive areas, such as ears, eyes, brain (e.g., mobile device held at the user's ear)—may be subject to a "whole body" SAR limit; (2) Body situation with the mobile device near major limbs or lower torso (e.g., worn in belt holster)—may be subject to a "partial body" SAR limit; (3) Hands and fingers situation (e.g., in operation with keyboard and screen in use)—may be subject to a "hands, wrist, feet and ankles" SAR limit; (4) Not near any body parts situation (>20 cm) (e.g., not near the user)—may be subject to a "field strength" limit; and (5) Special situations may apply for users that, for example, have electrically operated medical implants or implants that use RF communications, or users that are accessing Public Safety networks.

V. Exemplary Antenna Matching Measurement

The present embodiments may utilize a means to detect the operating or exposure situation of the mobile device and provide a method to dynamically adjust the total RF power in situations where the exposure conditions are different. This may permit the mobile device to be operated with increased total RF power if needed and appropriate, and thus may improve range, performance, coverage, services, and/or RF efficiency. The ability to have higher uplink RF power, for example, may improve range significantly and reduce usage of network resources (i.e., occupy the RF channel for lesser time than would be required with a lower uplink power).

The operating or exposure situation of the mobile device may be detected by a combination of measurements. Two examples may be sensing the matching (or "loading") of the RF antenna(s) and knowledge of the currently active application operating in the device. The antenna sensing measurement may be primarily used to determine the proximity to the user's body, while the active application may further define the user's relation to the device.

The mobile device may sense its proximity to the user or other objects though a measurement of the matching of the antenna to the internal RF amplifier circuitry. The matching of the antenna may be affected by the proximity of the mobile device and its antenna(s) to the user and nearby objects. A different matching may be measured when the mobile device is near the head, near the lower torso, held in the hands and fingers, or not near the user or other people. A measurement of the antenna matching may thus be used as an indication of the mobile device user's exposure situation.

Figure 3:
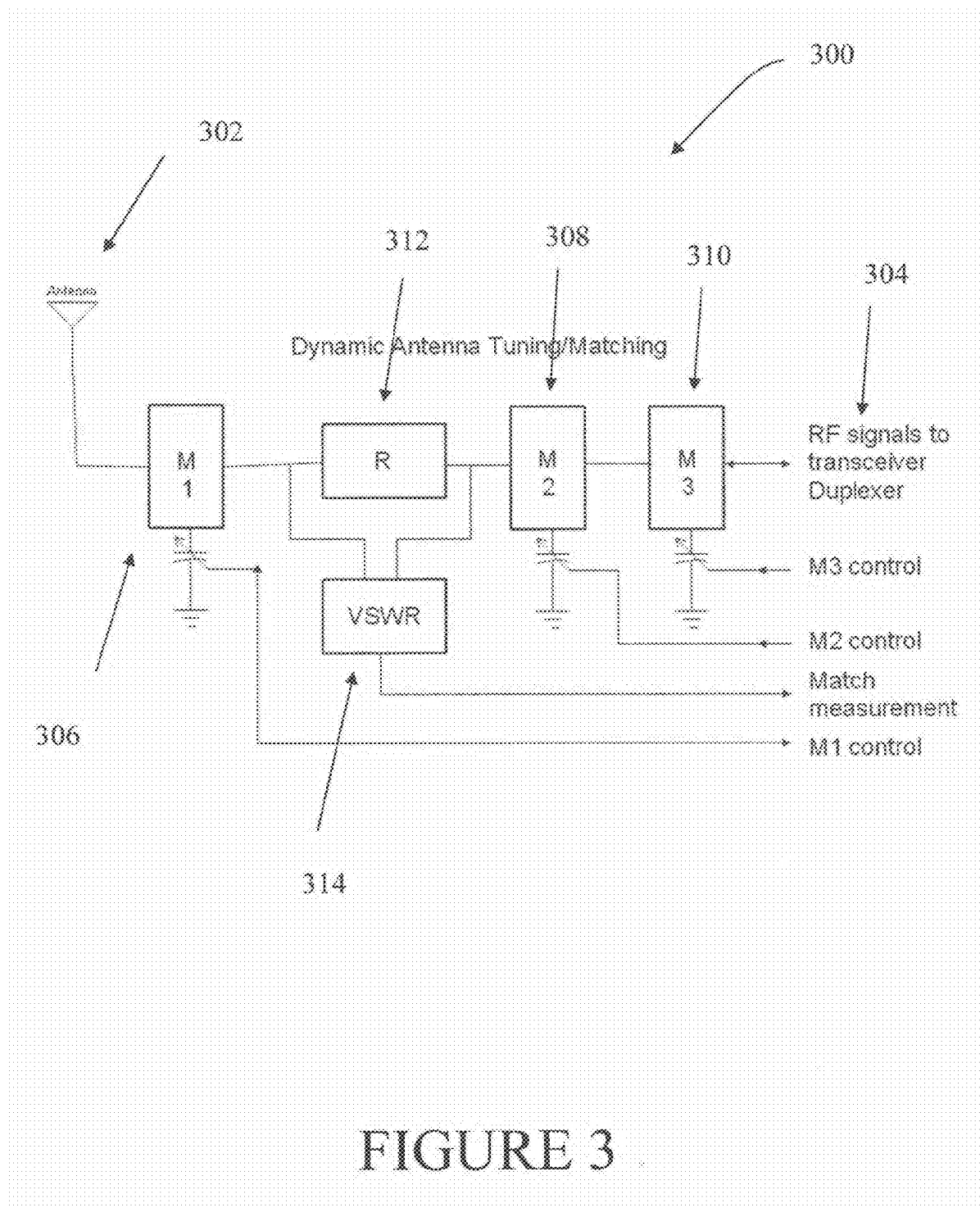
FIG. 3 depicts an exemplary apparatus for measuring antenna matching.

The match-measurement apparatus may be installed in the mobile device for these measurements or it may be included, for example, as a part of the automatic tuning of the power amplifier or the antenna to ensure its most efficient coupling. An exemplary match measuring apparatus 300 is illustrated by FIG. 3, where it is shown as a part of an automatic dynamic antenna tuning/matching process (the automatic tuning process is not needed for aspects of the present embodiments—only the match measurements). If the dynamic antenna matching apparatus is included in the mobile device, advantage of it may be taken to also provide the dynamic power control measurements. Otherwise, the measuring apparatus may be included to facilitate the mobile device dynamic total RF power control process.

As depicted in FIG. 3, the antenna 302 of the mobile device may be coupled to the RF transceiver Duplexer 304 via a number of tuning elements M1 306, M2 308, and M3 310 (depicted as adjustable elements) and the Match measurement sensor R 312 and VSWR 314. The antenna matching may, for example, be measured as the Voltage Standing Wave Ratio (VSWR) 314 at the sensing element R 312 in the transmission path to the antenna 302 for the operating RF frequency channel.

The VSWR 314 may measure the ratio of the power flowing towards the antenna 302 to the power that is reflected back from the antenna 302 when the transceiver 304 is transmitting. A VSWR 314 of 1 may indicate that all of the power is flowing towards the antenna 302 and there is a "perfect" match. A VSWR 314 measurement greater than one may indicate that some power is being reflected back from the antenna 302 and the antenna 302 may not be "matched". A change in the power reflected back from the antenna 302 typically may indicate that external objects are in proximity to the antenna 302. If the VSWR 314 differs from the expected value (i.e. values measured during testing/calibration in free space), it may indicate the proximity of the antenna 302 to objects nearby. Generally, for example, closer objects will reflect more power back towards the antenna and the VSWR measure will increase. The VSWR may thus be used as a measure of the distance from the mobile device to external objects. Proximity of the antenna 302 to objects, particularly those containing saline solutions like the head and other body parts, may change the antenna tuning, and thus its match to the mobile device's RF circuitry.

The sensing element R 312 may comprise a transmission line and/or be circuitry mounted on a circuit board. The sensing element R 312 may comprise resistance, capacitance, and/or inductance characteristics. The VSWR 314 may measure the voltage on each side of the sensing element R 312 and compare the two voltages to determine the amount of power reflected back into the mobile device during a transmission and thereby calculate the VSWR. Other sensing elements may be used.

VI. Exemplary Calibration Table

During design/testing/calibration of the mobile device, the VSWR measurements may be recorded for various operating or exposure situations, including near the head, near the torso, in the fingers/hands, and in free-space. These calibration measurements may be stored in a memory unit in the mobile device for use later during operation. When the mobile device is in use, the measurements of the VSWR may be compared to the stored measurements to determine the exposure situation and/or corresponding RF power limit of the mobile device. Ranges of VSWR measures may be applied for each of the head, torso, fingers/hands, and free space scenarios to enable the mobile device to determine its situation in differing individual conditions and/or the appropriate RF power limit.

In one embodiment, for each operating or exposure situation, the calibration table or other data structure may store a corresponding RF power or RF power limit. As a result, once the mobile device determines its operating or exposure situation based upon, for example antenna matching, active applications, power control process, RF wavelength, the number and/or type of active radios, and/or other factors discussed herein, the mobile device may also be able to determine or retrieve a corresponding RF power or RF power limit that is appropriate for the operating or exposure situation from the calibration table or other data structure.

The sensitivity of the antenna matching to proximity to body parts may vary with the RF frequency. Typically, for example, antennas operated at higher frequencies may be more disturbed by external objects in their matching than those at lower frequencies. Higher frequencies may also be more sensitive to the difference between bone and flesh. This effect may be used to help differentiate proximity to the head (dominated by the skull-bone) and the lower torso (dominated by flesh). Thus, the calibrations and the operating measurements may be made using multiple antennas and multiple frequencies to help define the mobile device's proximity to different body parts.

The calibration table stored in the mobile device may include multiple entries for each of the mobile device's antennas and operating RF frequencies or wavelengths. If the table includes multiple antennas and operating RF frequency bands or wavelengths, the mobile device may better determine its proximity to the user's body by measuring the matching of multiple antennas and frequency bands or wavelengths, and then comparing the "signature" of the matching measurements against the signature ranges stored in the calibration table for various exposure situations.

In some cases, users with special needs, for example those with active medical implants, may also program their mobile device to provide additional power restrictions. These additional restrictions may be used by the mobile device to modify the operating power of the mobile device in various exposure situations. The mobile device may, for example, additionally limit the power of the mobile device when it is determined to be near the body torso (i.e., close to a pacemaker for example), while there may need to be no additional protection when the mobile device is determined to be operating away from the body (free space) or in the hands. The protection restrictions may include reduced power levels and not using specific RF frequency bands to which the implants may be especially sensitive.

VII. Exemplary Power Control Process Operation

In operation, the operating or exposure situation of the mobile device may be determined dynamically by measuring the antenna matching. Furthermore, the mobile device may also know its actual operating power as directed by the network power control algorithm, and thus the closeness to the exposure maximum threshold or additional mobile device "headroom" available.

So, for example, a mobile device that is operating on its LTE radio at half power (20 dBm) due to network power control may still allocate 20 dBm for the WiFi radio and remain within the 23 dBm total power limit for the current exposure situation. However, if the mobile device is in a different exposure scenario, for example, operating in the hands of the user where a higher exposure may be allowed, it may allocate additional power (e.g., 23 dBm to the WiFi) and signal to the network that it has additional headroom for the LTE power control process, and hence take efficient advantage of additional bandwidth or higher order modulation formats.

In one embodiment, in order to enable the network to take advantage of the mobile devices' wider range of RF power, the mobile device may communicate its "power headroom" to the network as part of the power control process signaling. The headroom may be normally signaled to the network based upon the mobile device's worst case operating situation. For a mobile device that may sense its operating situation and determine when an additional RF power may be appropriate, the mobile device may dynamically signal the network of an additional power level at which the mobile device may transmit. This power number may be limited by a combination of the current exposure limit as determined by the mobile device's situation and the capability of the mobile device's RF circuitry and battery condition. The network power control process may then allocate network resources, including bandwidth, modulation formats and coding, time assignments and power, to the mobile device for fast and efficient transmission of data from the mobile device to the network. In some cases, the mobile device may elect to reduce its headroom to conserve battery power, and hence extend the "talk-time" of the mobile device to better maintain the user's quality of experience.

Additionally or alternatively to the network power control process, other power control processes may also utilize the mobile device headroom that remains available for use, such as power control processes associated with relays, nodes, access points, HomeNodeB's, WiFi AP's, the mobile device, and/or other devices. Other power control process-related functionality of the present embodiments is discussed elsewhere herein.

VIII. Exemplary Monitoring of Active Applications

The mobile device may also monitor and take into consideration its active applications to help determine its relation to the user and/or operating situation, including the applications disclosed directly below. By combining the measured proximity information (i.e., from the antenna matching measurements) with knowledge of the current applications operating in the mobile device, the mobile device may better determine dynamically what its appropriate exposure situation is. As the total exposure limit is determined mainly by the mobile device's proximity to a nearby human body, especially by proximity to the head (such as when holding the mobile device at the ear for a voice call), applications which require the mobile device to be held away from the head or the body may take advantage of the different exposure environment in setting the total RF power limit.

A mobile device with an active keyboard/touch-screen application for texting or internet browsing, for example, may be held in the hands away from the body, and thus may be operated at a higher total RF power limit.

Handling a voice call with the speaker-phone application also indicates that the mobile device may be away from the user's body and able to use higher power limit. Note that a "voice-call" may be either a traditional "circuit switched" format (e.g., GSM) or a "packet switched" format (e.g., VoIP—Voice over Internet Protocol).

The volume setting of the speaker phone mode may be used to indicate the distance from or separation of the mobile device from the user, with larger volumes settings indicating greater separation from the user and hence reduced exposure risk. In contrast, an active voice call, without the speaker phone or headphone application, may indicate that the mobile device is being operated near the ear, and thus is in its highest exposure condition.

A mobile device using its earphone or "Bluetooth" connection in a music playback mode or for a voice call, may also be taken to be in an operating situation with the mobile device separated from the head, although, perhaps, located elsewhere on the body (e.g., belt clip or pocket). If the mobile device is in a "holster" (e.g., a pocket clip) that is typically worn on part of the body (i.e., at the waist or hip), the mobile device may be subject to different power limits than when at the head.

An active display application, such as viewing video, print material, or photographs, on the screen may also indicate that the mobile device is separated from the body and hence with reduced exposure risk. In this condition, an RF power level for reduced exposure situation, such as hands-fingers, may be used by the mobile device.

A mobile device operating in camera mode may also not be operating in close proximity to the user's body. Rather, it may be in the fingers and hands exposure situation, and the mobile device may use an appropriate RF power limit.

An idle mobile device with a match measurement indicating it is in free space on a table or otherwise away from people may, for example, be able to use the free space field strength limit. An idle mobile device with a match measurement indicating it is in a holster worn on the torso may, for example, be in the partial body exposure situation and use a corresponding RF power limit.

If the mobile device is being operated in a public safety radio application, this may indicate a professional situation (e.g., "Occupational/Controlled Exposure"), and thus a power level for the appropriate occupational exposure limit may be selected for use by the mobile device.

The foregoing is exemplary, and not an exhaustive list of applications that may be utilized to help determine the exposure situation of the mobile device. For instance, speech-related applications may indicate that the mobile device is near a user's ear, while text-related or video-related applications may indicate that the mobile device is in the user's hands. If there is no current active applications it may indicate that the mobile device is idle and in free space or in a holster, and not near a user's ear.

The detection of application activity, such as use of speech, holster, and/or speakerphone, may be used by the mobile device for dynamically determining the total exposure situation and the appropriate total power limit. The higher total RF power limit may enable the mobile device to use multiple radios (i.e., like WiFi) and/or take advantage of additional bandwidth channels associated with the device services.

Table III below illustrates exemplary possibilities for various operating scenarios, and antenna match/proximity measurements. As shown, in one embodiment, it may be appropriate to use head or whole body related exposure limits for mobile device voice operations; torso or partial body exposure limits for mobile device holster or idle operations; finger, hands, feet, or ankle exposure limits for mobile device hands free voice, keyboard-touch, display download/viewing, browsing, and email operations; and/or free space exposure limits for mobile device hands free voice, display download/viewing, and idle operations.

TABLE III

Combination of Operating Environments and Applications

| Consumer Application | Head [whole body] | Torso [partial body] | Fingers, Hands, Feet, Ankles | Free-space [greater than 20 cm separation] |
|---|---|---|---|---|
| voice | X | | | |
| Hands free voice | | | X | X |
| Keyboard-touch | | | X | |
| Display download (viewing) | | | X | X |
| holster | | X | | |
| browsing | | | X | |
| email | | | X | |
| idle | | X | | X |

More specifically, in Table III, the situation measured from the antenna matching is along the top row for the four regions generally corresponding to close proximity to head, torso, fingers or free-space (separation >20 cm). An exemplary selection of primary applications is in the left horizontal column. The "X" indicates an appropriate power maximum for the situation. Thus, a voice application indicates applicability of the "head" exposure limit. Similarly, an application requiring finger use indicates applicability of the "fingers" exposure limit. In this way, the mobile device may combine its knowledge of the primary application and the antenna matching proximity to determine the appropriate maximum power to remain within exposure limits.

In a further embodiment, the user may wish to protect their personal medical implants. In this situation, the user may enter into the mobile device (e.g., using the keyboard or an application interfacing the device dynamic total RF power control process), the required limits, and/or the affected body region. This information, for example, may be conveniently stored as entries in the operating table such as shown in Table III. In operation, the mobile device may sense the operating situation and application, and further restrict the total RF power based upon the measurements and the user's supplied parameters. For example, if the mobile device was measured to be operating near the user's torso, a power reduction or specific frequency bands may be disabled to protect an implanted pacemaker. As another example, measured proximity to the head may be used by the mobile device to provide protection or coupling to the user's hearing aids. Some devices, for example, include apparatus to couple to the user's hearing aids, and this may be activated when the device's location is measured as close to the head.

IX. Exemplary Dosage-Related Embodiments

The effects on the user of the RF exposure may, in some cases, be determined not only by the RF power level but also by the duration. A low power exposure over a long interval may be equivalent to a higher power over a short interval.

In one aspect, the "device dynamic total RF power control process" of the present embodiments may be extended to measure the exposure situation in relation to the user, the power levels actually used, and their duration. The device power control process may then integrate the actual exposure for each of the situations (i.e., head, torso, fingers, distant) over time, such as a 24 hour day or other time period, such as a week, a month, a quarter of a year, or year. This cumulative exposure or dosage may then be compared against a threshold and the operating power of the mobile device may be adjusted to keep the cumulative exposure or dosage within appropriate limits for each situation.

For example, if the cumulative exposure is well below the limit, extra RF power may be allowed (e.g., through signaling network power control of the extra headroom) for short intervals to improve the quality of experience of the user. In some cases, for example, a short exposure to high power may be allowed if the overall cumulative exposure has been low all day.

Additionally or alternatively, if the cumulative exposure is getting close to a time period limit, the mobile device may constrain the RF power used (e.g., through signaling network power control of reduced power headroom or by locally adjusting the RF power level of the mobile device). In some instances, the mobile device may initiate a change in RF mode to reduce power exposure (e.g., from broadband LTE to GSM for voice calls), or the user may be instructed (e.g., through locally generated speech prompts or user displays) to switch to another mode of usage (e.g., changing a voice call to hands free operation or to utilize a headset to reduce the head exposure).

In mobile devices that are also used for PS or PPDR applications, the cumulative exposure may be measured for both the commercial and occupational modes and limits applied for each or for the combination of services. In this way, the effects of cumulative exposure may be measured and, when appropriately below thresholds, allow additional RF power for intervals to improve the user's communications quality of experience.

X. Exemplary Mobile Device

Figure 4:
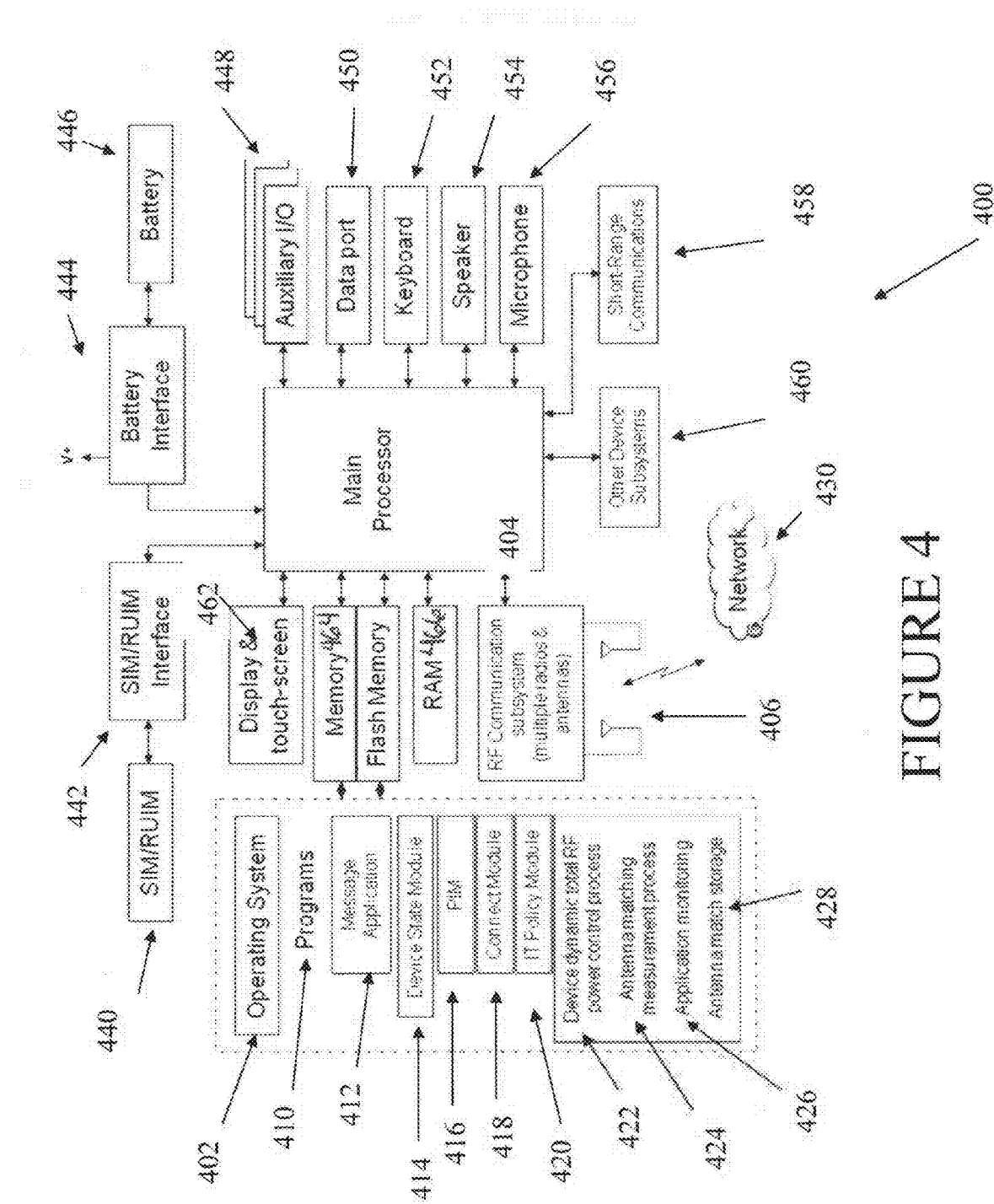
FIG. 4 depicts exemplary dynamic total RF power control process functionality implemented in a mobile device.

FIG. 4 depicts an exemplary mobile (personal portable) device or smart-phone configured with functionality related to the present embodiments. The "device dynamic total RF power control process" of the present embodiments may be a system application that may be conveniently included in the mobile device. For example, the device dynamic total RF power control process may be a part of the programs that may be typically included in the operating system of the mobile device and stored in the operating memory of the processor that controls the mobile device and its activities.

The dynamic total RF power control process may be able to direct an antenna matching measurement process (interacting with the antenna matching and sensing circuitry associated with the RF communication subsystem), to perform application monitoring based upon the main processor activities, determine transmission frequency or wavelength, determine the number and/or type of active radios, determine available power headroom for use with power control processes, and/or have other functionality. The mobile device may also provide storage or a memory for storing the antenna matching parameters measured during calibration/manufacture and that are used during mobile device operation to distinguish proximity of the mobile device to the user and/or other items in the environment.

The dynamic total RF power control process may also interact with the network power control process operating as part of the main processor and communicate the dynamic power control headroom parameters to the network process for dynamic power control. The communication with the network power control process may typically occur using the resources of the RF communications subsystem and its associated multiple radios, antennas, and protocol stacks.

The ability of the present embodiments to enable higher RF powers dynamically in certain situations, and hence providing longer operational range, may be especially helpful for application of equipment used for PPDR operations. The PPDR devices, being for specialist operation, may permit increased exposure limits and utilize increased RF power (for example up to 3 Watts, about +35 dBm). By means of the methods of the present embodiments, the PPDR capable devices may automatically switch exposure mode between "General Population/Uncontrolled Exposure" and "Occupational/Controlled Exposure" depending upon activity or services (traffic) involved. Thus, the present embodiments may provide for improved performance when needed for the PPDR network services, such as during emergency conditions, by using the higher power limits available.

Generally, the total RF emission power may not be a problem for exposure at the network fixed base stations (e.g., "NodeB" in LTE systems), as these base stations may be typically separated from users by significant distances, which in turn reduce the signal strengths below the appropriate exposure field strength limits. For people that do come close to the RF equipment and antennas of the base stations, such major installations are typically deemed "Occupational/Controlled Exposure" environments. In one embodiment, the receiver of the user's device may be used to monitor the strength of nearby base station signals and measure the accumulated RF dosage if the user is nearby to base station transmitters and antennas. In the event that the exposure limit is exceeded or about to be exceeded shortly, the user may be informed by the mobile device of the situation so they can take appropriate actions such as moving away from the transmitter.

The introduction and wide deployment of small local network base stations (e.g., HomeNodeB) may typically be in environments corresponding to "General Population/Uncontrolled Exposure" situations and subject to field strength limits as they are generally more than 20 cm from users. In some situations, a HomeNodeB may be approached closer than 20 cm by users and hence be restricted by SAR limits. A similar exposure situation may occur for broadband access points for WiFi systems. The WiFi equipment that uses 50 and 100 MHz channels may benefit from being able to operate at power levels that keep the same PSD as that used for the narrow band (i.e., 20 MHz bandwidth access points). Otherwise, their bandwidth advantage may be limited to short ranges. The methods and apparatus of the present embodiments may also be applied to HomeNodeB and WiFi broadband access points to enable them to sense their exposure environment and adopt total power limits suitable for the local conditions. Those Access Points or HomeNodeB that are measured to be in proximity to nearby users may be more restricted in their total power emissions than those that are measured to be more distant from the nearby people.

As shown in FIG. 4, the exemplary mobile device 400 configured to have functionality related to the present embodiments may include an operating system 402, a main processor 404, a RF communication subsystem 406, a "device dynamic total RF power control process" 422, and/or other components, including those shown. Mobile devices with additional, fewer, or alternate components may be used.

It should be noted that a similar configuration of additional apparatus to support the functionality for the present embodiments is also applicable to HomeNodeB or WiFi access points or similar network attached equipment that may be located in a general population/uncontrolled environment.

The operating system 402 may include or work with a number of programs 410, such as a message application 412, device state module 414, PIM (Personal Information Manager) 416, connect module 418, IT (Information Technology) policy module 420, and/or other functionality. The operating system 402 may include or work with the device dynamic total RF power control process 422 of the present embodiments and as described herein. The device dynamic total RF power control process 422 application may include an antenna matching measurement process 424, application monitoring 426 functionality, and/or an antenna match storage 428, and/or other functionality.

The antenna matching measurement process 424 may facilitate determining an operating situation of the mobile device and/or determining a proximity of the user to the mobile device during use. For instance, the antenna matching measurement process 424 may determine an amount of RF power being transmitted by the mobile device and an amount of RF power from the transmission being reflected back into the mobile device. In one embodiment, the antenna matching measurement process 424 may measure the VSWR across a sensing element in the transmission path of the mobile device, such as described and shown in relation to FIG. 3 previously. The antenna matching measurement process may include additional, less, or alternative functionality.

The antenna matching measurement process 424 may access predetermined measurement values that are stored in a memory unit during calibration, manufacture, or testing of the mobile device, i.e., an antenna match storage 428. During operation, the mobile device 400 may use a real-time measured VSWR as an index to a look up table or other data structure. Using the measured VSWR, the look up table of calibration values may return an expected mobile device operating situation and/or operating situation value, such as a RF power or RF power limit, or other exposure-related limit, corresponding to the operating situation associated with the measure VSWR. The RF power limit stored may ensure that an exposure limit is not exceeded for the operating situation corresponding to the VSWR measured during operation. The antenna match storage 428 may store additional, fewer, or alternative values.

The application monitoring 426 functionality may include determining which applications are currently active on the mobile device 400. Certain applications may be associated with, for example, speech, text, viewing, browsing, hands free, and/or other user operations, including those discussed elsewhere herein. From the user operations associated with the application, a corresponding mobile device operating situation and/or an appropriate exposure level and/or corresponding RF power limit may be determined, such as whole body or partial body, as discussed above (such as in connection with Table III). For instance, based upon the active application(s), the mobile device 400 may retrieve an appropriate RF power or RF power limit from a memory or calibration table, such as the antenna match storage 428. The application monitoring may include additional, fewer, or alternative functionality, including functionality discussed elsewhere herein.

The mobile device 400 may include a RF communication subsystem 406. The RF communication subsystem 406 may include multiple radios and antennas. For instance, the RF communication subsystem 406 may include LTE, WiFi, Bluetooth™, and/or other radios. The number and/or type of active radios may be monitored by the main processor 404 and/or the device dynamic total RF power control process 422 to facilitate determining the operating situation of the mobile device 400. Additionally or alternatively, the frequency and/or wavelength of the mobile device transmission(s) and/or receptions may be monitored by the main processor 404 and/or the device dynamic total RF power control process 422 to facilitate determining the operation situation of the mobile device 400. For instance, the mobile device 400 may use the number and/or type of active radios and/or the frequency and/or wavelength of transmissions as indexes to retrieve corresponding operating situations and/or associated RF power or RF power limits from a data structure, such as calibration table, queue, array, list, etc.

In one embodiment, the device dynamic total RF power control process 422 may determine a current operating situation of the mobile device 400 based upon one or a combination of factors, such as results of the antenna matching measurement process 424; application monitoring 426; the number and/or type of active radios of the RF communication subsystem 406; the frequency or wavelength of transmissions from the RF communication subsystem 406 to the network 430; a power control process of the network 430, a HomeNodeB, a WiFi AP, or other relay, node, or device; exposure or dosage limits; and/or other factors, such as medical implants of a user or other factors discussed elsewhere herein.

For instance, the mobile device 400 may use one or a combination of the foregoing factors as an index to retrieve a corresponding current operating situation and/or associated RF power or RF power limit from a data structure, such as calibration table, queue, array, list, etc. The device dynamic total RF power control process 422 may then adjust the RF power or RF power limit of the mobile device 400 based upon the current operating situation to facilitate enhanced operation of the mobile device 400 within appropriate exposure limits.

In another embodiment, the device dynamic total RF power control process 422 may determine an available power headroom for the mobile device 400. The RF communication subsystem 406 may transmit the available power headroom to (a) the network 430 for use with a network power control process; (b) a HomeNodeB for use with a HomeNodeB power control process; (c) a WiFi AP for use with a WiFi AP power control process; and/or (d) to other devices for use with other power control processes. The network, HomeNodeB, WiFi AP, or other power control process may adjust or set a new RF power or RF power limit for the mobile device 400 based upon available headroom and/or network resources and transmit the new RF power or RF power limit to the mobile device 400. Subsequently, the mobile device 400 may adjust its RF power to the remotely determined RF power or RF power limit to facilitate enhanced operation of the mobile device 400 within appropriate exposure limits.

As shown in FIG. 4, the mobile device 400 may also include a SIM (Subscriber Identity Module)/RUIM (Removable User Identity Module) 440 and a SIM/RUIM interface 442 interconnected with the main processor 404; a battery 446 and battery interface 444 interconnected with the main processor 404; and/or auxiliary input/output devices or ports 448, such as a data port 450, keyboard 452, speaker 454, and microphone 456. The mobile device 400 may also include other device subsystems 460 and be configured for short-range communications 458. The mobile device 400 may also include a display and touch screen 462, a memory and/or flash memory 464, and/or a RAM (Random Access Memory) 466. The mobile device may include additional, fewer, or alternate components.

In one embodiment, the mobile device 400 may be configured to dynamically control the total RF power emissions of the mobile device 400. The mobile device 400, such as via the main processor 404 and/or the device dynamic total RF power control process 422, may be configured to determine the local RF operating situation of the mobile device 400; set a maximum power limit according to the local RF operating situation; and/or adjust an active transmitted power within the maximum power limit, such as a maximum power limit according to an applicable exposure limit, remote power control process, network limit, and/or other factors. The local RF operating situation of the mobile device 400 may be determined based upon (1) a measuring of a matching or a loading of the mobile device's 400 radio antenna(s), such as the radios and/or antennas of the RF communication subsystem 406 and/or short-range communications system 458; (2) currently active applications on the mobile device 400, such as applications related to speech, voice, keyboard, touch, text, viewing, holster, browsing, email, idle, hands free, and/or other operations/applications; (3) the number and/or type of active radios on the mobile device, such as the radios and/or antennas of the RF communication subsystem 406 and/or short-range communications system 458; (4) the frequency or wavelength of the mobile device's 400 transmission(s); (5) a power control process associated with a network 430, relay, node, HomeNodeB. WiFi AP, and/or the mobile device 400; and/or (6) network 430, HomeNodeB, WiFi AP, relay, local node, and/or mobile device 400 exposure, dosage, or other RF or RF power-related conditions. The mobile device 400 may be a hand-held device (such as a cell phone, smart-phone, laptop or notebook computer, tablet, etc.), a HomeNodeB (HNB), WiFi AP, or other access point, relay, node, or device capable of RF wireless transmissions.

XI. Exemplary Methods

Noted above, the present embodiments, inter alia, provide a method of dynamically controlling the total RF power emissions of a mobile device (or HomeNodeB, WiFi AP, etc.). The method may include determining the local RF operating or exposure situation of a mobile device; setting the maximum power limit according to the operating or exposure situation; and/or adjusting the active transmitted power within the maximum power limit, such as adjusting the active transmitted power within a maximum power limit according to an applicable power control process. The applicable power control process may be a network power control process running at a network base station or other network location. Alternatively, the applicable power control process may be a relay, node, access point, HomeNodeB, WiFi AP, device, and/or mobile device power control process run by a processor associated with the relay, node, access point, HomeNodeB, WiFi AP, device, and/or mobile device.

Determining the local RF operating situation of the mobile device may include, for example, considering the matching of the radio antennas, the active applications in the device, and/or the frequency or wavelength of transmissions. Setting the maximum power limit may include choosing a RF power limit based upon exposure limits for different situations. The choosing of exposure situations may be by comparison with value ranges stored in the mobile device (such as stored in a look up table, list, queue, tree, array, or other data structure storing calibration or test related values) that have been measured during calibration, manufacture, and/or testing. The different situations may include antenna matching measurements corresponding to one of the following conditions: (a) proximity to head, (b) proximity to torso, (c) proximity to fingers, hands, feet, and ankles, and (d) operating in free space away from body proximity. For each situation, a corresponding RF power limit may be stored in a memory for retrieval by a processor.

The proximity situation may be chosen based upon the active applications in the mobile device. The active application may include, for example, one of voice call, keyboard usage, game activity, navigation, video screen viewing, hands free, usage of headset or Bluetooth™ accessory. A mobile device may be configured to use the matching measurement mechanism and the storage of ranges of match values for each scenario. The mobile device may also be configured to determine the active application(s). In the event that there are multiple applications active, the one that indicates the most restrictive exposure condition should be used to set the dynamic RF power emissions limits.

In one aspect, a method of dynamically controlling the total RF power emissions of a mobile device may be provided. The method may include determining the local RF operating situation of the mobile device; setting a maximum power limit according to the local RF operating situation; and/or adjusting an active transmit power or active transmit power limit within the maximum power limit. The local RF operating situation may be determined based upon (1) a measuring of a matching of one or more radio antennas, and/or (2) one or more active applications on the mobile device. The mobile device may be a hand-held device, a HomeNodeB, WiFi AP, or other access point, relay, node, or device with RF communication functionality.

The maximum power limit may be based upon or correspond to an exposure limit for a specific operating situation. For instance, the different operating situations may include antenna matching measurements corresponding to proximity to a user's head, proximity to the user's torso, proximity to the user's fingers or hands, or operating in free space away from body proximity. Additionally or alternatively, the one or more active applications on the mobile device may provide speech, text, viewing, hands free, browsing, email, idle, holster, or other functionality as detailed herein. The exposure and/or RF power limit may be determined based upon values stored in a memory on the mobile device and that have been measured during calibration, testing, and/or manufacture.

In another aspect, the local RF operating situation may be determined based upon one or more factors. For example, in addition to measuring radio antenna matching and/or active applications, the RF operating situation may additionally or alternatively take into account or be determined based upon (a) network, relay, access point, and/or node RF operating or exposure conditions; (b) a network, relay, access point, and/or node power control process; and/or (c) the frequency or wavelength of transmitted or received radio waves. In one embodiment, the matching or loading of a radio antenna may be measured via a Voltage Standing Wave Ratio (VSWR) measurement that indicates a ratio of an amount of power being transmitted via the radio antenna(s) to an amount of power being reflected back into the mobile device.

In another aspect, the method may entail the mobile device dynamically signaling power headroom available for remote power control processes to a network, relay, access point, or node. The active transmit power or active transmit power limit may be adjusted within the maximum power limit according to the applicable network, relay, access point, node, or other power control process.

Additionally or alternatively, the active transmit power or active transmit power limit may be further adjusted based upon (1) user dosage accumulated over time; (2) the number, type, and/or location of medical devices implanted within (or associated with) a user; and/or (3) emergency conditions and/or the mobile device operating or communicating with public safety networks, such as discussed elsewhere herein.

XII. Exemplary Method Embodiments

As discussed herein, in one embodiment, a method of dynamically controlling the total RF power emissions of a mobile device may be provided. The method may include determining the local RF operating or exposure situation of the mobile device; setting a maximum power limit according to the local RF operating situation; and/or adjusting an active transmitted power within the maximum power limit, such as a maximum power limit according to an applicable exposure limit, power control process, network limit, and/or other factors. The local RF operating situation may be determined based upon (1) a measuring of a matching or a loading of the mobile device's radio antenna(s); (2) currently active applications on the mobile device, such as applications related to speech, voice, keyboard, touch, text, viewing, holster, browsing, email, idle, hands free, and/or other operations/applications; (3) the number and/or type of active radios on the mobile device; (4) the frequency or wavelength of the mobile device's transmission(s) and/or received transmission(s); (5) a power control process associated with a network, relay, node, access point, HomeNodeB, WiFi AP, and/or the mobile device; and/or (6) network, relay, local node, access point, HomeNodeB, WiFi AP, and/or mobile device exposure, dosage, or other RF or RF power-related conditions. The mobile device may be a hand-held device (such as a cell phone, smart-phone, laptop or notebook computer, tablet, etc.), a HomeNodeB (HNB), WiFi AP, or other device, relay, access point, or node capable of RF wireless transmissions.

In another embodiment, a method of dynamically controlling the total RF power emissions of a mobile device may be provided. The method may include determining the local RF operating or exposure situation of the mobile device;

and/or adjusting an active transmit power or active transmit power level of the mobile device based upon the local RF operating situation. The local RF operating situation of the mobile device may be determined based upon one or more factors, such as (a) measuring a matching of one or more radio antennas on the mobile device; (b) which applications on the mobile device are currently active; (c) a number and/or type of mobile device active radio antennas; (d) the frequency or wavelength of the mobile device's transmission(s) and/or received transmission(s); (e) a power control process associated with a network, relay, node, access point, HomeNodeB, WiFi AP, and/or the mobile device; and/or (f) network, relay, node, access point, HomeNodeB, WiFi AP, and/or mobile device exposure, dosage, or other RF or RF power-related conditions. The mobile device may be a hand-held device, a HomeNodeB, WiFi AP, or other device with RF communication functionality, including those disclosed elsewhere herein.

In another embodiment, a method of dynamically controlling the total RF power emissions of a mobile device may be provided. The method may include determining the local RF operating or exposure situation of the mobile device; and/or increasing or decreasing an active transmit power and/or active transmit power limit of the mobile device based upon the local RF operating situation. The active transmit power or power limit of the mobile device may be adjusted such that the performance of the mobile device may be optimum for a given exposure and/or dosage limit, i.e., the mobile device remains compliant with exposure and/or dosage limits, such as Specific Absorption Rate (SAR) and/or field strength limits, while mobile device performance may be enhanced. The local RF operating situation of the mobile device may be determined by: (a) measuring a matching or loading of the mobile device's active radio antenna(s), such as via a Voltage Standing Wave Ratio (VSWR) measurement; (b) which applications on the mobile device are currently active, such as applications related to speech, voice, text, keyboard, touch, hands free, idle, holster, browsing, viewing, email, or other operations/applications that indicate a proximity and/or relationship between the mobile device and the user; (c) the number and/or type of radios in use by the mobile device, such as WiFi, LTE, Bluetooth™, and other radios; (d) the frequency or wavelength of the mobile device's transmission(s) and/or received transmission(s); (e) a power control process associated with a network, relay, node, access point, HomeNodeB, WiFi AP, and/or the mobile device; and/or (f) network, relay, node, access point, HomeNodeB, WiFi AP, and/or mobile device exposure, dosage, or other RF or RF power-related conditions. The mobile device may be a hand-held device, a HomeNodeB, WiFi AP, or other device, relay, access point, or node capable of RF wireless transmissions, including those disclosed elsewhere herein.

In addition to the foregoing, the method may include means for further adjusting an active transmit RF power or RF power limit based upon, in addition to the mobile device operating or exposure situation, one or more of the following: (a) user dosage accumulated over time; (b) medical devices implanted within (or associated with) a user; and/or (c) emergency conditions and/or operation with public safety networks. For instance, for each potential operating situation and dosage, medical implant, and/or public safety network, a corresponding RF power limit may be stored in a data structure that is retrievable by the mobile device, such as by using the combination of the operating situation and dosage, medical implant, and/or public safety network as an index to a look up table or other data structure. The method may include or implement additional, less, or alternate actions, including the actions and functionality detailed elsewhere herein.

Figure 5:
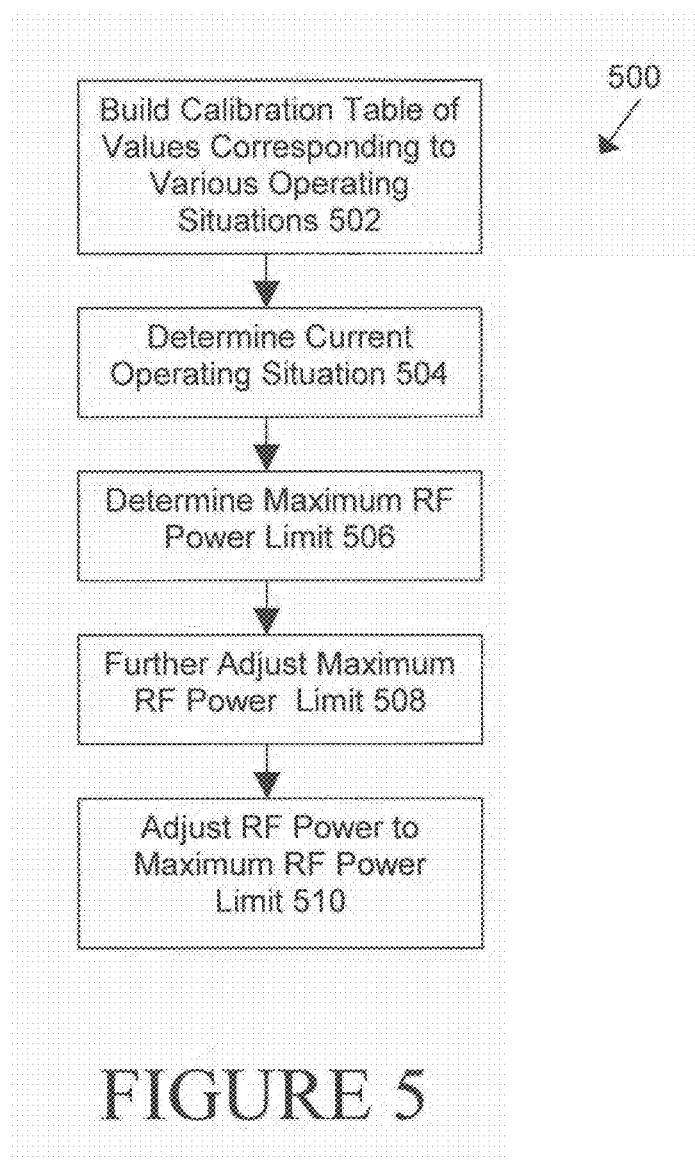
FIG. 5 illustrates an exemplary method of dynamically setting the total allowable RF transmit power or power limit of a mobile device.

FIG. 5 illustrates an exemplary method of dynamically setting the total allowable RF transmit power or power limit of a mobile device 500. The method 500 may include building a calibration table of values and/or ranges of values corresponding to various mobile device operating situations 502, determining a current mobile device operating situation during operation in real-time 504, determining a maximum RF power limit based upon the current operating situation 506, optionally further adjusting the maximum RF power limit 508, and adjusting the RF power of the mobile device to the maximum RF power limit 510. As a result, mobile device performance may be enhanced while remaining compliant with exposure limits. The method may include additional, fewer, or alternate actions.

The method 500 may include building a calibration table of values (or ranges of values) corresponding to various mobile device operating situations 502. As explained above, during manufacture, calibration, and/or testing, data may be gathered and stored in a data structure, such as a calibration table, related to expected exposure levels that a user may experience during various operating situations. For instance, exposure levels may be gathered and stored for various antenna matching measurements, various operating applications, various frequency and wavelength of transmissions, various numbers and/or types of active radios, various power control process, and/or other RF or RF-related conditions. The data structure may also store corresponding RF power and/or RF power limit values for each exposure level and/or operating situation.

The method 500 may include determining a current mobile device operating situation during operation in real-time 504. The current operating situation may be based upon an antenna match measurement, the active applications, the frequency or wavelength of radio transmissions, the number and/or type of active radios, a local or remote power control process, other RF or RF-related conditions, and/or a combination of the foregoing factors.

The method 500 may include determining a maximum RF power limit based upon the current operating situation 506. The current operating situation may be used to retrieve a corresponding exposure limit and/or maximum RF power limit for a data structure, such as the calibration table mentioned above. The current operating situation may be used as an index to locate a corresponding exposure limit and/or an associated maximum RF power limit within the calibration table or other data structure having predetermined values.

The method 500 may optionally include further adjusting the maximum RF power limit 508. The method may further adjust or refine the maximum RF power limit based one or more additional factors, such as (a) user dosage accumulated over time; (b) medical devices implanted with a user; and/or (c) emergency conditions and/or operation with public safety networks.

The method 500 may include adjusting the RF power of the mobile device to the maximum RF power limit 510. The operating RF power of the mobile device may be increased or adjusted to the maximum RF power limit such that performance of the mobile device may be enhanced. Operating at the dynamically established RF power limit, the mobile device may achieve enhanced communication range, data throughput, multi-radio operation, bandwidth usage, and/or other performance capabilities as compared to using static RF power limits.

In another embodiment, a method of dynamically controlling the total RF power emissions of a mobile device may be provided. The method may include determining a local RF operating situation of the mobile device; and/or increasing or decreasing an active transmit power or active power level of the mobile device based upon the local RF operating situation such that performance of the mobile device is optimum while remaining SAR (Specific Absorption Rate) or field strength compliant. The local RF operating situation of the mobile device may be determined based upon one or more factors, such as measuring a matching of one or more active radio antennas on the mobile device; the active applications, remote or local power control process, wavelength of radio transmissions, the number and/or type of active radios, and/or other factors discussed herein.

The method may also include determining an available power headroom of the mobile device based upon the local RF operating situation of the mobile device; transmitting the available power headroom of the mobile device to a network, access point, node, or relay; remotely adjusting (at a network, access point, node, or relay) a maximum power limit of the mobile device according to a power control process associated with the network, access point, node, or relay; and/or locally adjusting at the mobile device an active transmit power of the mobile device in accordance with the maximum power limit remotely determined by the network, access point, node, or relay power control process. The method may include additional, fewer, or alternate actions, including those discussed elsewhere herein.

XIII. Exemplary Mobile Device Embodiments

In one embodiment, a mobile device configured to dynamically control the total RF power of its emissions may be provided. The mobile device may include means for determining the local RF operating or exposure situation of the mobile device; means for setting a maximum power limit according to the local RF operating situation; and/or means for adjusting an active transmitted power within the maximum power limit, such as a maximum power limit according to an applicable exposure limit, power control process, network limit, and/or other factors. The local RF operating situation may be determined based upon (1) a measuring of a matching or a loading of the mobile device's active radio antenna(s); (2) currently active applications on the mobile device, such as applications related to speech, voice, keyboard, touch, text, viewing, holster, browsing, email, idle, hands free, and/or other operations/applications; (3) the number and/or type of active radios on the mobile device; (4) the frequency or wavelength of the mobile device's transmission(s) and/or received transmission(s); (5) a power control process associated with a network, relay, node, access point, HomeNodeB, WiFi AP, and/or the mobile device; and/or (6) network, relay, local node, access point, HomeNodeB, WiFi AP, and/or mobile device exposure, dosage, or other RF or RF power-related conditions. The mobile device may be a hand-held device (such as a cell phone, smart-phone, laptop or notebook computer, tablet, etc.), a HomeNodeB (HNB), WiFi AP, or other device, relay, access point, or node capable of RF wireless transmissions. The mobile device may include a processor and/or "device dynamic total RF power control" application, such as detailed elsewhere herein, that provides for or implements the "means for" functionality noted above.

In another embodiment, a mobile device configured to dynamically control the total RF power of its emissions may be provided. The mobile device may include means for determining the local RF operating or exposure situation of the mobile device; and/or means for adjusting an active transmit power or active transmit power level of the mobile device based upon the local RF operating situation. The local RF operating situation of the mobile device may be determined based upon one or more factors, such as (a) measuring a matching of one or more active radio antennas on the mobile device; (b) which applications on the mobile device are currently active; (c) a number and/or type of mobile device active radio antennas; (d) the frequency or wavelength of the mobile device's transmission(s) and/or received transmission(s); (e) a power control process associated with a network, relay, node, access point, HomeNodeB, WiFi AP, and/or the mobile device; and/or (f) network, relay, node, access point, HomeNodeB, WiFi AP, and/or mobile device exposure, dosage, or other RF or RF power-related conditions. The mobile device may be a hand-held device, a HomeNodeB, WiFi AP, or other device with RF communication functionality, including those disclosed elsewhere herein. The mobile device may include a processor and/or "device dynamic total RF power control" application, such as detailed elsewhere herein, that provides for or implements the "means for" functionality noted above.

In another embodiment, a mobile device configured to dynamically control the total RF power of its emissions may be provided. The mobile device may include means for determining the local RF operating or exposure situation of the mobile device; and/or means for increasing or decreasing an active transmit power and/or active transmit power limit of the mobile device based upon the local RF operating situation. The active transmit power or power limit of the mobile device may be adjusted such that the performance of the mobile device may be optimum for a given exposure and/or dosage limit, i.e., the mobile device remains compliant with exposure and/or dosage limits, such as Specific Absorption Rate (SAR) and/or field strength limits, while mobile device performance may be enhanced. The local RF operating situation of the mobile device may be determined by: (a) measuring a matching or loading of the mobile device's active radio antenna(s), such as via a Voltage Standing Wave Ratio (VSWR) measurement; (b) which applications on the mobile device are currently active, such as applications related to speech, voice, text, keyboard, touch, hands free, idle, holster, browsing, viewing, email, or other operations/applications that indicate a proximity and/or relationship between the mobile device and the user; (c) the number and/or type of radios in use by the mobile device, such as WiFi, LTE, Bluetooth™, and other radios; (d) the frequency or wavelength of the mobile device's transmission(s) and/or received transmission(s); (e) a power control process associated with a network, relay, node, access point, HomeNodeB, WiFi AP, and/or the mobile device; and/or (f) network, relay, node, access point, HomeNodeB, WiFi AP, and/or mobile device exposure, dosage, or other RF or RF power-related conditions. The mobile device may be a hand-held device, a HomeNodeB, WiFi AP, or other device, relay, access point, or node capable of RF wireless transmissions, including those disclosed elsewhere herein. The mobile device may include a processor and/or "device dynamic total RF power control" application, such as detailed elsewhere herein, that provides for or implements the "means for" functionality noted above.

In addition to the foregoing, the mobile device may include means for further adjusting an active transmit RF power or RF power limit based upon, in addition to the mobile device operating situation, one or more of the following: (a) user dosage accumulated over time, (b) medical devices implanted within (or associated with) a user; and/or (c) emergency conditions and/or mobile device operation with public safety networks. The mobile device may include a processor and/or "device dynamic total RF power control" application, such as detailed elsewhere herein, that provides for or implements the "means for" functionality noted above. The mobile device may include additional, less, or alternate functionality, including the functionality detailed elsewhere herein.

The mobile device may also include means for determining an available power headroom of the mobile device based upon the local RF operating situation of the mobile device; means for transmitting the available power headroom of the mobile device to a network, access point, node, or relay; means for receiving a remotely adjusted (at a network, access point, node, or relay) maximum power limit of the mobile device according to a power control process associated with the network, access point, node, or relay; and/or means for locally adjusting (at the mobile device) an active transmit power of the mobile device in accordance with the maximum power limit remotely determined by the network, access point, node, or relay power control process. The mobile device may include additional, fewer, or alternate components, including those discussed elsewhere herein.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

What is claimed is:

1. A method of dynamically controlling the total RF power emissions of a mobile device, the method comprising:
    determining which applications are currently active at the mobile device;
    measuring a matching of one or more mobile device active radio antennas to determine a proximity of a user to the mobile device;
    setting a maximum power limit of the mobile device according to the the applications that are currently active and the proximity of the user using a table stored at a memory of the mobile device, the table comprising a list of applications and a corresponding maximum power limit for at least one proximity of the user to the mobile device; and
    adjusting an active transmit power or active transmit power limit of the mobile device within the maximum power limit, the adjusting including disabling specific frequency bands.

2. The method of claim 1, wherein the mobile device is a hand-held device, a HomeNodeB, or WiFi Access Point (AP).

3. The method of claim 1, wherein the applications that are currently active on the mobile device provide one or more of speech, text, viewing, and hands free functionality.

4. The method of claim 1, wherein the at least one proximity of the user to the mobile device stored in the table include proximity to a user's head, proximity to the user's torso, proximity to the user's fingers or hands, or operating in free space away from body proximity.

5. The method of claim 1, wherein the maximum power limit is further set based upon a number and/or type of mobile device active radio(s).

6. The method of claim 1, wherein the maximum power limit is further set based upon a frequency or wavelength of transmitted radio waves.

7. The method of claim 1, wherein the active transmit power or active transmit power limit is adjusted within the maximum power limit according to an applicable remote power control process.

8. The method of claim 1, wherein the mobile device may dynamically signal power headroom available for network power control processes.

9. The method of claim 1, wherein the active transmit power or active transmit power limit is further adjusted based upon user dosage accumulated over time.

10. The method of claim 1, wherein the active transmit power or active transmit power limit is further adjusted based upon medical devices implanted within an associated user.

11. The method of claim 1, wherein the active transmit power or active transmit power limit is further adjusted based upon emergency conditions and/or mobile device operation with public safety networks.

12. The method of claim 1, wherein the matching of a radio antenna is measured via a Voltage Standing Wave Ratio measurement that indicates a ratio of an amount of power being transmitted via the radio antenna to an amount of power being reflected back into the mobile device.

13. A method of dynamically controlling the total RF power emissions of a mobile device, the method comprising:
    determining a local operating situation of the mobile device based upon a combination of: a measuring of a matching of one or more mobile device active radio antennas; and one or more active applications operating on the mobile device; and
    increasing or decreasing an active transmit power or active power level of the mobile device according to the local operating situation, including disabling specific frequency bands, and using a table stored at a memory of the mobile device, the table comprising a plurality of local operating situations, such that performance of the mobile device is optimum while remaining SAR (Specific Absorption Rate) or field strength compliant.

14. The method of claim 13, the method further comprising:
    determining an available power headroom of the mobile device based upon the local RF operating situation of the mobile device;
    transmitting the available power headroom of the mobile device to a network;
    adjusting a maximum power limit of the mobile device according to a network power control process associated with the network; and
    adjusting an active transmit power of the mobile device in accordance with the maximum power limit remotely determined by the network power control process.

* * * * *